UNITED STATES PATENT OFFICE.

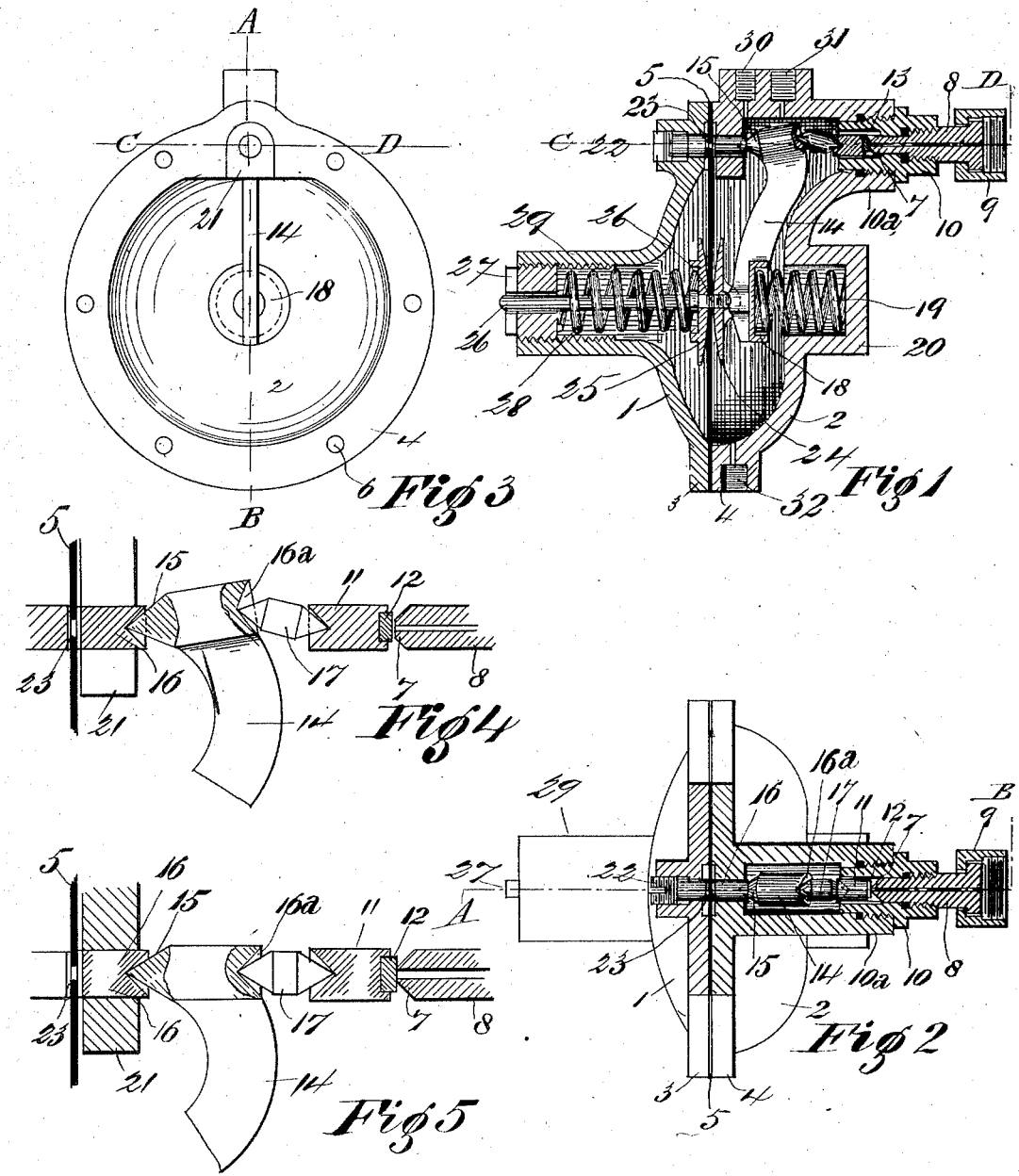

THOMPSON R. BELL, OF INDIANAPOLIS, INDIANA.

FLUID-PRESSURE REGULATOR.

SPECIFICATION forming part of Letters Patent No. 489,176, dated January 3, 1893.

Application filed September 26, 1892. Serial No. 446,934. (No model.)

*To all whom it may concern:*

Be it known that I, THOMPSON R. BELL, a citizen of the United States, residing at Indianapolis, in the county of Marion and State of Indiana, have invented new and useful Improvements in Fluid-Pressure Regulators, of which the following is a specification.

My invention relates to improvements in fluid pressure reducing and regulating valves, and consists in a peculiar arrangement of mechanism for opening and closing the valve thereof, and is particularly applicable to fluids under very high pressure which have to be reduced to a very low pressure.

The object of my invention is to provide a regulating valve, in which the friction of the valve regulating and operating mechanism will be reduced to a minimum, and to construct a machine that will be cheap and durable in its construction, and uniformly accurate and sensitive in the extreme at all ranges of reduced pressure or at any pressure at which the machine is set to reduce the high pressure fluid. I attain these objects by means of the machine illustrated in the accompanying drawings, in which similar numbers of reference designate like parts throughout the several views.

Figure 1. is a side sectional elevation of the regulator through the lines A. B. (See Figs. 2. and 3.) Fig. 2. is a part sectional plan of the same taken through the lines C. D. (See Figs. 1. and 3.) Fig. 3. is a front elevation of the regulator showing the front cover removed, Fig. 4. is an enlarged detail view of the valve mechanism showing the valve in its open position, and, Fig. 5. is a similar view showing the reducing valve in its closed position.

The machine is composed of the front and the rear casings 1. and 2. having the integral peripheral flanges 3. and 4. between which the flexible diaphragm 5. is clamped and firmly secured by the securing bolts 6. arranged at suitable intervals around said flanges 3. and 4. to secure a close tight joint. The diaphragm 5. may be of any suitable flexible and resilient material, but a good quality of rubber has been found to give best results. The valve seat 7. formed on the end of the nipple 8. is preferably of a blunt conical form and has its outer projecting end fitted with the coupling 9. by which connection is made with the reservoir containing the fluid under pressure. The enlarged portion of the nipple 8. is threaded to neatly fit into its union 10 which is also threaded to be securely fitted and screwed into the top bossed portion 10ᵃ. of the rear casing care being had to avoid all possibility of leakage through this joint. The opening and closing valve 11. is preferably cylindrical in form and has its face counterbored or recessed to receive the facing 12. which is preferably of vulcanite, or any softer baser material than that of the valve seat, and is provided for the purpose of securing a perfect closure of the valve on its seat. The valve 11. is preferably cylindrical in form, and is adapted to slide longitudinally or in the direction of its axis in the bore or guideway formed in the end of the union 10. wherein it loosely fits.

To insure the free escape of the fluid from the opening of the nipple 8. when the valve 11. is unseated, I provide the longitudinal grooves 13. (which may be either formed in the bore of the union 10., or on the peripheral surface of the valve 11.) through which the fluid freely flows into the gas chamber of the regulator. The regulating lever 14. is fulcrumed on a knife edge or center 15. formed on the suspension or oscillating point or end of the regulating lever, said point preferably of a harder material than that of the lever, and is adapted to center in the counter-bore formed in the end of the fulcrum 16.: the opposite end of the oscillating end or shorter arm of the regulating lever 14. having the counter-bore 16ᵃ. formed therein and adapted to receive the pointed end of the toggle or distance pin 17., the opposite pointed end of the latter adapted to bear or center in the counter-bore formed in the end of the valve 11. The longer arm of the regulating lever 14. is cupped or recessed to receive the end of the counter-spring 19. which latter has its opposite end seated in the pocket 20. formed in the rear casing 2.: said spring provided for the purpose of insuring the quick prompt action of the regulating lever in responding to the vibrations of the diaphragm 5. resulting from any slight decrease or falling off of the pressure as the fluid is used. The movable fulcrum 16. is directly opposite and on line with the valve 11. and is adapted to slide longitudinally in its guide-ways 21. formed integral on the rear casing 2. The fulcrum adjusting screw 22. is screwed into the front casing 1. and is in perfect alignment with the axis of the inner movable fulcrum 16. and the valve 11. and is adapted to contact with the intercepting button 23. secured on the diaphragm 5. by means of its flanges or disks which tightly clamp and firmly hold said diaphragm. The button also bears on the end of the movable fulcrum 16. to limit its end play. The button 23 is preferably of a very unyielding hard material as steel, and is preferably formed with collars which are provided for the purpose of lapping over the edges of the perforation made in the diaphragm to receive the stem of said button 23. for the purpose of securing a perfect joint and avoiding a leak. The diaphragm 5. is firmly clamped at its center between the spring pressure plates 24. and 25. by the securing and clamping screw 26. which has its outer end prolonged through the central opening formed in the spring pressure regulating nut 27. for the purpose of guiding and maintaining and supporting the diaphragm in position. The plate 25. is cupped on one of its sides for the purpose of receiving the end of the pressure spring 28. which spring loosely plays in its guiding socket 29. and has its tension adjusted by means of the adjusting nut 27. threaded to fit the threaded portion of said socket 29. The threaded openings 30. and 31. are provided for attaching to the usual safety valve and steam gage connections and the lower or exit opening 32. is provided for connecting the usual hose or any suitable pipe connection for conveying the fluid under reduced pressure to the appliance wherein it is used.

The operation of the apparatus is as follows:—The coupling 9. is first securely screwed and attached to the escape valve of the reservoir containing the fluid under high pressure and which is required to be reduced to a very diminished low pressure for use. The valve of the reservoir is then opened to admit the high pressure fluid to the regulating valve 11. the pressure of the fluid instantaneously opens the valve and admits a portion of the fluid into the chamber of the regulator. The diaphragm 5. owing to the pressure of the incoming fluid, is forced forward and against the pressure spring 28. to compress it an amount proportional to the pressure at which the regulator is set by the regulating screw or nut 27. which movement releases the end of the longer arm of the lever 14. and permits its movement forward through the action of the counter spring 19. to immediately close the valve 11. and when the pressure of the fluid confined in the regulator has attained its maximum pressure or the pressure at which the spring 28 is set; thus as the fluid is used and reduced in pressure in the chamber of the regulator, the least degree, the diaphragm immediately responds to operate the mechanism to open the valve 11. and to raise the pressure of the fluid in the chamber of the regulator to the normal height. The working or bearing points of the lever and its connections, being centered on knife edges or steel pointed centers, friction is reduced to an inappreciable extent, and the mechanism is rendered sensitive in the extreme and prompt in its action and thereby more readily maintains the reduced fluid at a constant and unvarying pressure a matter of great importance in regulators required to reduce a fluid under an exceptionally high pressure to a very and excessively low pressure.

Having thus fully described the nature and operation of my invention what I claim as new and useful and desire to cover by Letters Patent of the United States therefor is:—

1. In a fluid pressure regulator the combination with a suitable front and rear casing and an interposed diaphragm, of a valve in said casing, a regulating lever having unequal arms, and with its shorter pointed arm fulcrumed opposite said valve, and an intercepting distance piece having its centered ends or points engaging the end of said valve and the shorter arm of said regulating lever, and suitable counteracting and pressure springs engaging the longer arm of said lever, substantially as set forth.

2. In a fluid pressure regulator the combination with suitable front and rear casings and an interposed flexible diaphragm, of a valve and its seat, said valve adapted to move longitudinally and in line with said seat, a regulating lever having unequal arms and fulcrumed on the pointed end of the shorter arm, a toggle or distance pin having pointed ends and engaging suitable recesses formed in the end of said valve and shorter arm of said regulating lever, and suitable counter and pressure springs engaging the end of said lever and the center of said diaphragm, substantially as set forth.

3. In a fluid pressure regulator, the combination with suitable rear and front casings and an interposed flexible diaphragm, of a reducing valve and its seat, said valve adapted to move longitudinally and in line with said valve seat, an adjustable fulcrum, a regulating screw engaging said fulcrum on the opposite side of said diaphragm, and a suitable regulating lever between said valve and movable fulcrum, and an intercepting pin for connecting said valve to said lever and suitable pressure and countersprings engaging said lever and center of diaphragm, substantially as set forth.

4. In a fluid pressure regulator, the combination with the front and the rear casing thereof and an interposing flexible diaphragm, of a valve and its seat, said valve adapted to move longitudinally and in line with said seat, a movable fulcrum directly opposite said valve, a regulating lever having unequal arms, one of the pointed arms of which is fulcrumed or centered on the recessed end of said movable fulcrum, a distance bar or toggle having its opposite ends reduced to a point and adapted to engage recesses formed in the end of said short arm of the regulating lever and said valve, a suitable fulcrum regulating screw opposite to and on the exterior side of said diaphragm, an intercepting piece or button of an unyielding material passing through said diaphragm, between said movable fulcrum and its adjusting screw and having its opposite flanges clamping said diaphragm, substantially as set forth.

In testimony whereof I have hereunto set my hand in the presence of two subscribing witnesses.

THOMPSON R. BELL.

Witnesses:
 JNO. GEO. THORETTE,
 C. F. R. WAPPENHAUS.